March 5, 1929.  E. A. CONAWAY  1,704,558
LATCHING DEVICE
Filed May 9, 1927  3 Sheets-Sheet 1.

INVENTOR.
E. A. CONAWAY.
By Albert J. McCauley
ATTORNEY.

March 5, 1929.   E. A. CONAWAY   1,704,558
LATCHING DEVICE
Filed May 9, 1927   3 Sheets-Sheet 2
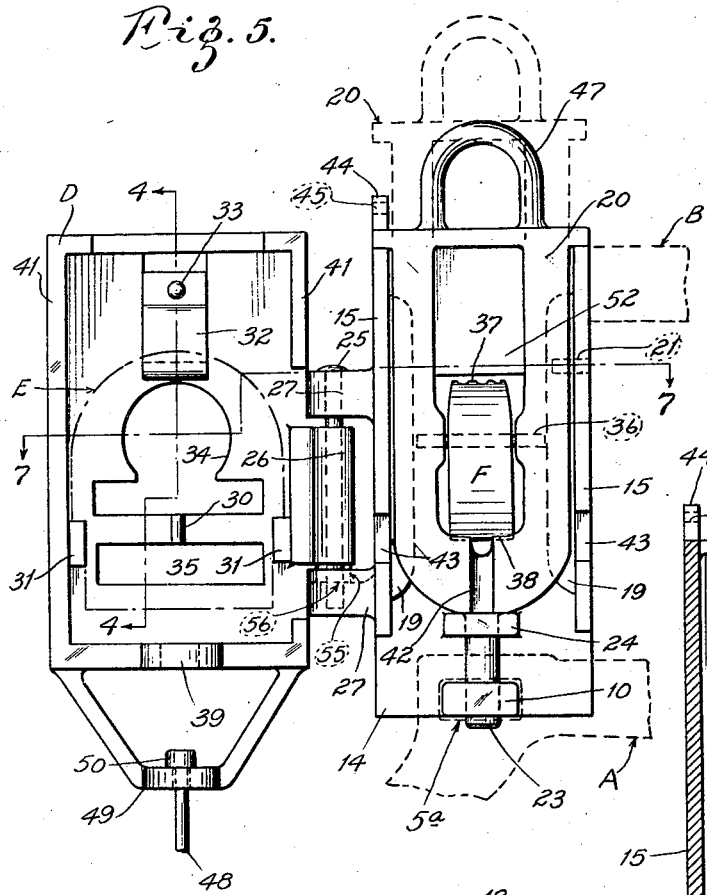
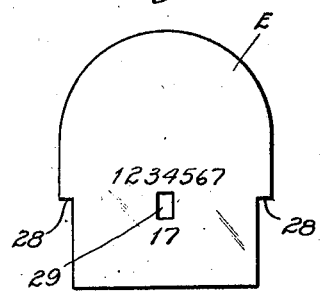
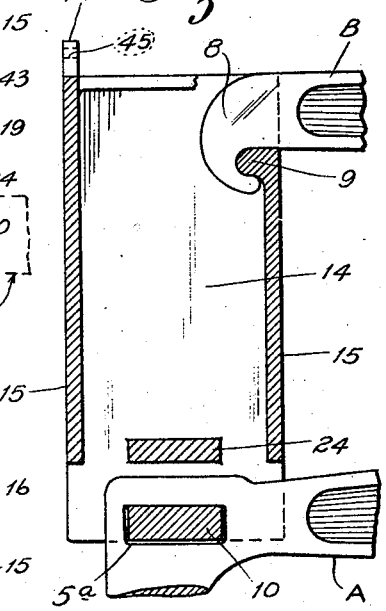
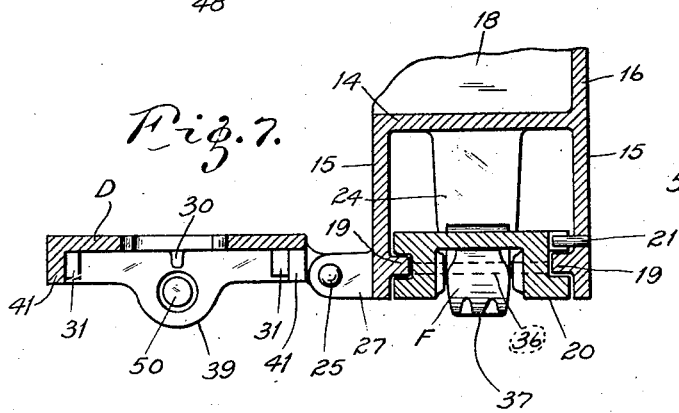
INVENTOR:
E. A. CONAWAY.
By Albert J. McCauley
ATTORNEY.

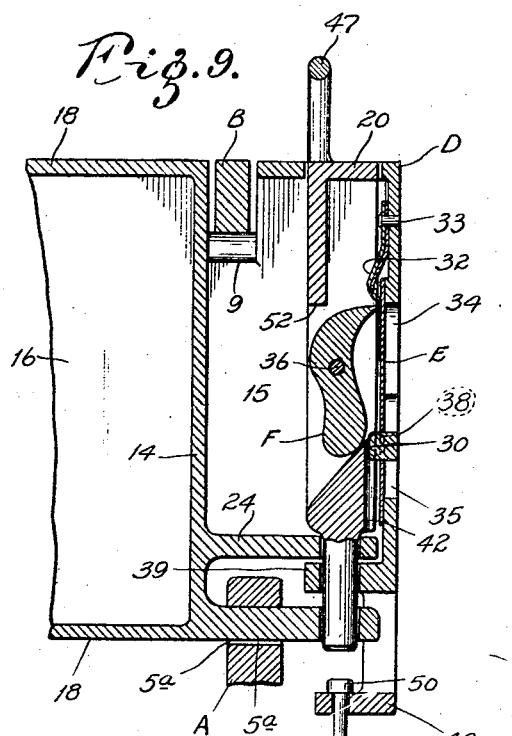
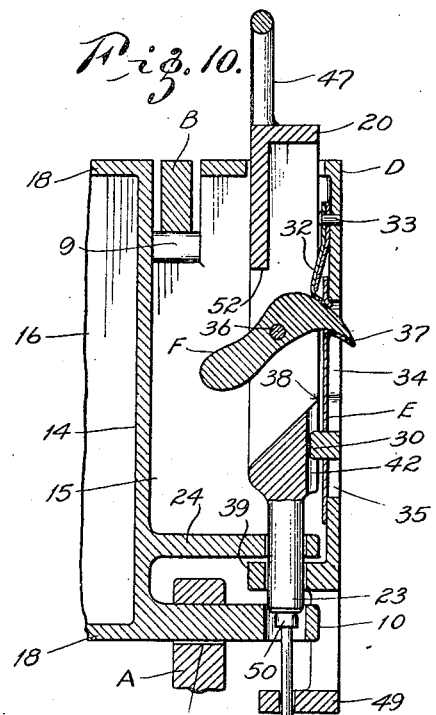
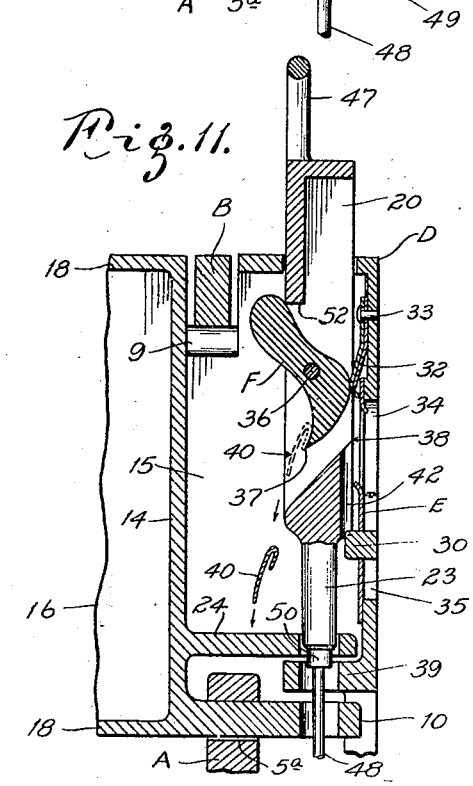
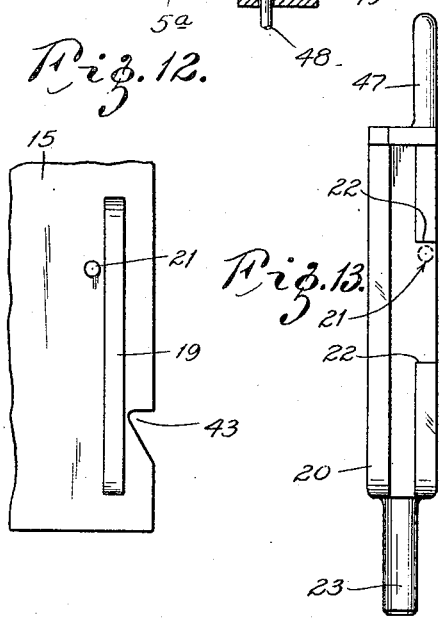
INVENTOR
E. A. CONAWAY.
By Albert J. McCauley
ATTORNEY.

Patented Mar. 5, 1929.

1,704,558

UNITED STATES PATENT OFFICE.

ERNEST A. CONAWAY, OF LITTLE ROCK, ARKANSAS, ASSIGNOR TO JEAN H. CONAWAY, OF CLAYTON, MISSOURI.

LATCHING DEVICE.

Application filed May 9, 1927. Serial No. 189,934.

This invention relates to improvements in latching devices, or fastening devices. One of the objects is to produce a device of this kind including a seal-rupturing and exciding member coperating with a seal to retain the latching means in its latched condition. In the preferred form of the invention, the act of unlatching the device forces the rupturing member into the seal, so as to make an excision therein.

A further object is to produce a seal holder adapted to securely hold the seal during the rupturing operation, and to also securely hold the portion of the seal remaining after the excision has been made.

Another object is to latch the seal holder and to so confine the seal that it cannot be removed or displaced without operating the rupturing and exciding member.

Another object is to utilize a simple and inexpensive sealing element clearly exposed to show the condition of the seal. In the preferred form of the invention the seals are made of sheet material, and if desired they can be made of weather-proof paper, or similar material adapted to be easily punctured in unlatching the device.

A further object is to produce an improved means for opening, closing and latching the doors of railway cars.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

To illustrate one form of the invention I have shown a latching device provided with a seal holder in the form of a hinged door, and a rupturing member adapted to puncture the seal during the unlatching operation. I have also shown how this rupturing member may cooperate with a shearing element to cut out and remove or excide a portion of the seal.

Fig. 5 is a front view of the latching device, with the seal holder in its open position.

Fig. 6 is a detail view of the seal.

Fig. 7 is a section taken approximately on the line 7—7 in Fig. 5.

Fig. 8 is a section taken approximately on the line 8—8 in Fig. 2, showing a hook and lever interlocked with a support.

Fig. 9 is a vertical section taken approximately on the line 9—9 in Fig. 1 showing the latching device in its latched condition.

Fig. 10 is a view similar to Fig. 9 illustrating the manner in which the seal-rupturing member is moved to puncture the seal at the beginning of the unlatching operation.

Fig. 11 is a view similar to Figures 9 and 10 suggesting the manner in which the rupturing device removes a portion of the seal.

Fig. 12 is a fragmentary view showing one of the guide ribs and a stop member on the support in which the latching device is slidably mounted.

Fig. 13 illustrates one side of the slidable member adapted to engage the rib and stop shown by Fig. 12.

To illustrate one form of the invention I have shown a portion of a car door 1 (Figures 1 and 2) and a portion of the post or abutment 2 at one side of the opening to be closed by the door.

Figure 1:
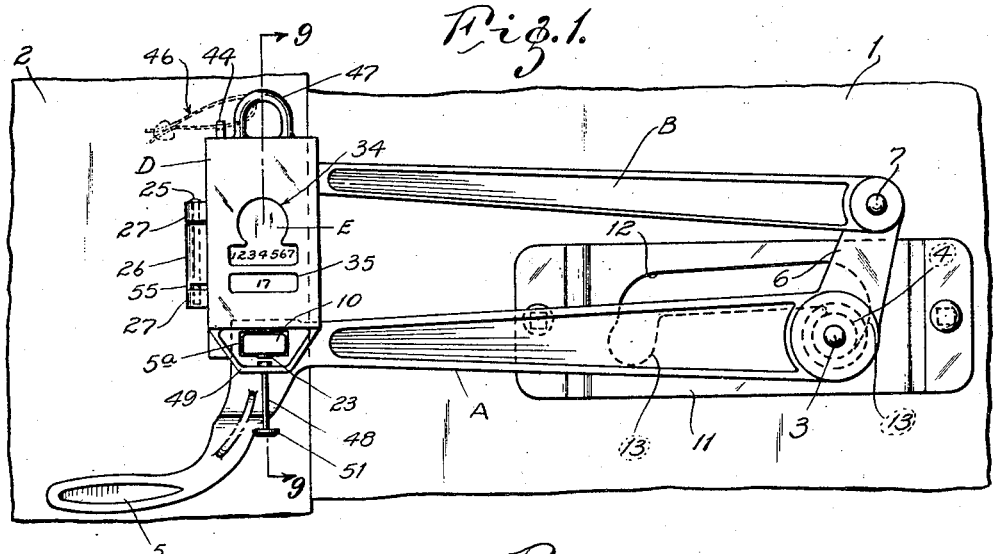
Fig. 1 is a front elevation of a latching device embodying the features of this invention, showing a portion of a door adapted to be latched and sealed by the device.
Figure 2:
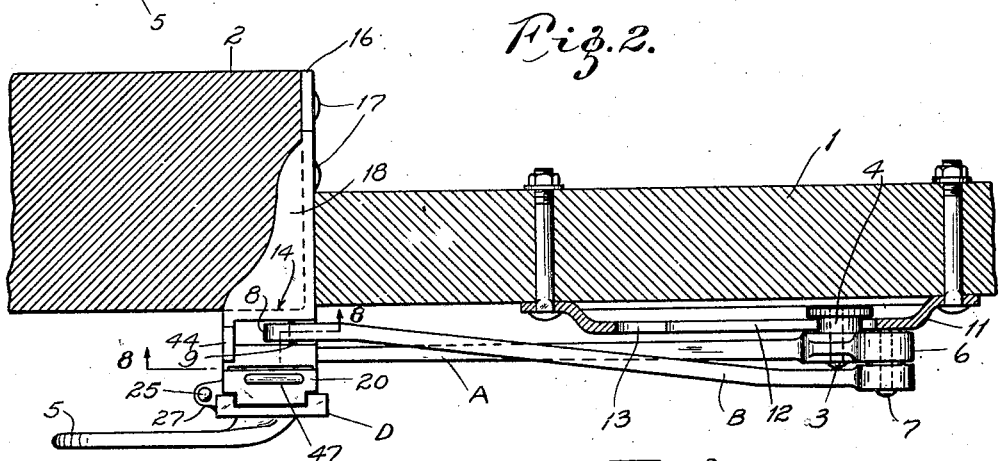
Fig. 2 is a top view of the structure shown by Fig. 1, with some of the parts in section.

The latching elements herein shown include a lever A having a fulcrum formed by a pin 3 and a roller 4 carried by the pin, as shown in Figures 1 and 2. The lever has a handle 5 at one end and an arm 6 extending upwardly at the other end. An arm B is pivoted at 7 to the upper end of the lever arm 6, and the free end of said arm B is provided with a hook 8 adapted to interlock with a lug 9, as shown most clearly in Fig. 8. The lever A is provided with an aperture 5ª to receive a lug 10, as shown in Figures 8 and 9.

Before describing the latching elements which cooperate with the lever A to secure both the lever and the arm B, I will refer to the means for securing these elements to the door. Figures 1 and 2 illustrate a plate 11 secured to the door 1 and having a slot 12 to receive the roller 4 which forms part of the fulcrum of the lever. The slot 12 extends downwardly at its ends, as shown at 13 in Fig. 1, and the roller 4 may be latched in either end of this slot. When the roller is latched as shown in Figures 1 and 2, the door is entirely closed, but when the roller is latched in the opposite end of the slot, the door is open far enough to provide ventilation, without giving access to the contents of the car.

The lugs 9 and 10 which interlock with the lever A and hook 8 (Fig. 8) are formed on a support which includes a vertical web 14 having flanges 15 extending forwardly from its side edges. An attaching web 16 (Fig. 2) extends rearwardly from the web 14 to receive fastening device 17. 18 designates reinforcing webs extending from the web 16 to the web 14.

Each flange 15 is provided on its inner face with a vertical guide rib 19 (Figures 5, 7 and 12), and a vertically movable latching element or latch bolt 20 is slidably mounted between the flanges 15, said latching element being grooved to receive the ribs 19, as shown by Figures 7 and 13. A stop member 21 extends from one of the flanges 15 and cooperates with shoulders 22 on the latching element 20 to limit the vertical motion of said latching element.

A latching finger 23, at the lower end of the slidable latching element 20, is adapted to extend through lugs 10 and 24, as shown by Figures 5 and 9, for the purpose of securing the lever A on the lug 10. The latching finger 23 also secures a seal holder, as will be hereafter described.

To illustrate one form of the invention I have shown a seal holder D in the form of a door secured to one of the flanges 15 by means of a vertical hinge pin 25 which passes through a lug 26 on the door and also through lugs 27 on the flange 15.

The seal E is shown in Figs. 1, 4, 5, 6, 9, 10 and 11. It is preferably made of sheet material, such as weather-proof paper, or other inexpensive material adapted to be easily punctured in unlatching the device. The seal shown most clearly by Fig. 6 is provided with abutment shoulders 28 at its sides, and a hole, or aperture 29. The lower portion of the seal is cut away, or recessed, to form the shoulders 28. The inner face of the door D is provided with lugs 30 and 31 adapted to interlock with the seal. The lug 30 extends through the hole 29 in the seal, while the lugs 31 lie below and contact with the abutment shoulders 28 on the seal, so as to positively prevent downwardly displacement of the seal. These lugs also cooperate with the seal to prevent lateral displacement.

The upper portion of the seal is held by an abutment 32 which may be in the form of a spring secured at 33 and having a relatively free lower edge to confine the seal, the upper margin of the seal being interposed between the spring 32 and the door D, as shown by Figures 5 and 9.

The door D is provided with openings 34 and 35 to expose the seal and disclose the origin thereof. The seal may be provided with a serial number exposed at the opening 34, as shown in Figure 1, and a station-indicating number exposed at the opening 35. The serial number herein shown is 1234567, and the station-indicating number is 17. A relatively large portion of the seal is exposed above the serial number, and I will hereafter describe the manner in which this portion of the seal is mutilated and excided in unlatching the device.

F designates a seal-rupturing member pivoted at 36 to the slidable element 20 and having a relatively sharp upper edge 37 adapted to be forced through the seal E, as suggested by Fig. 10, and also adapted to cooperate with a shearing edge 38 in cutting out and removing a portion of the seal, as will be presently described.

It is to be understood that the seal lies inside of the door D, and that said door is latched by means of the finger 23 which extends through a lug 39 on the door, as shown by Fig. 9. This lug 39 lies in the path of the lever A, so this lever cannot be removed from the lug 10 until after the door D is moved to its open position.

Fig. 9 illustrates the positions of certain parts when the lever A is latched and sealed. To release the lever A, it is necessary to first lift the slidable latching element 20 for the purpose of removing the latching finger 23 from the lugs 10 and 39, and to then open the door D.

I will now point out the manner in which the seal may be automatically ruptured and excided in response to the unlatching operation. When the device is latched, as shown by Fig. 9, the spring 32 lies directly above the seal-rupturing member F, and when the slidable member 20 is moved upwardly, the member F will contact with the lower edge of the spring, and the latter serving to deflect the sharp upper edge of the member F into the seal, as suggested by Fig. 10, thereby puncturing the seal at the beginning of the unlatching operation. During the continued upward movement of the slidable member 20, the puncturing member F turns on the pivot 36 and its sharp edge 37 cooperates with the shearing edge 38 on the slidable member 20, so as to cut out and remove or excide a portion 40 of the seal, as suggested by Fig. 11. During the unlatching operation, the puncturing member F moves from the position shown in Fig. 9 to the position shown in Fig. 10 and then to the position shown in Fig. 11, with the result of exciding a relatively large portion of the seal. The act of unlatching the device thus forms a large hole in the portion of the seal exposed at the opening 34, the hole being formed above the serial number. It will be seen that the origin of the seal may be determined both before and after the excision is made.

The seal is securely held during this puncturing and severing or exciding operation. The downward thrust on the seal is resisted by the lugs 30 and 31 which are interlocked with the lower portion of the seal, and the seal is also held at the top by means of the spring 32, the latter being forced onto the seal by pressure transmitted from the puncturing member F.

In addition to being secured by the elements just referred to, the seal is confined by flanges 41 at the sides of the door. The seal is also confined between the inner face of the door and the flanges 15 on the support to which the door is hinged.

The vertically movable latching element 20 is provided with a groove 42 (Figures 5 and 9) to receive the lug 30 which extends through the seal. The flanges 15 are notched at 43 (Figures 5 and 12) to receive the lugs 31 which engage the abutment shoulders on the seal.

Figure 3:
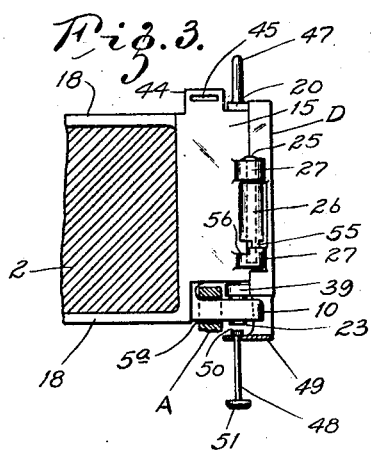
Fig. 3 is a side view, partly in section, showing a hinge connecting the seal holder to a support.
Figure 4:
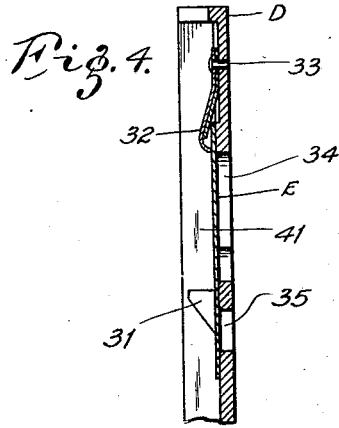
Fig. 4 is an enlarged vertical section on the line 4—4 in Fig. 5 illustrating a portion of the seal holder, and showing the seal secured thereto.

Under some conditions, one may desire to apply an ordinary sealing device to the latching element, and one of the flanges 15 is therefore provided with a lug 44 (Figures 1 and 3) having a slot 45 to receive a sealing member 46 shown by dotted lines in Fig. 1. A loop 47 is formed integral with and extends upwardly from the slidable element 20 to serve as a handle and also to receive the sealing element 46 which appears in Fig. 1.

The loop 47 may be engaged and forced upwardly for the purpose of unlatching the device, but I have shown that the unlatching operation can be more easily performed. 48 designates an unlatching member in the form of a rod arranged vertically below the latching finger 23, and slidably mounted in a holder 49 formed integral with the door B. The member 48 has a head 50 at its upper end adapted to strike the bottom of the latching finger 23, and a disk 51 at its lower end which is struck by the operator and forced upwardly during the unlatching operation.

The station number which appears at the opening 35 in Fig. 1 is stamped on the seal at the station where the car is sealed so as to indicate the point of origin of the seal at all times, and the absence of a number, or other station-indicating element, would show a defect in the seal. However, the ordinary defect lies in the large opening which is formed by the automatic exciding device, and it is obvious that a seal mutilated with an excision in this manner cannot be restored to appear as a perfect seal.

The seal rupturing member F is pivotally supported at 36, but its pivot motion is limited by a member 52 on the latching element 20, as shown in Fig. 11, which serves to limit the motion in one direction. When the member F occupies the normal position shown by Fig. 9, its lower end is relatively heavy, and the edge 38 on the latching element 20 limits the forward motion of this lower end. In latching the device, the slidable latching element 20 is forced downwardly relative to the spring 32, and this spring will yield sufficiently to allow the upper edge of the puncturing member F to pass from a position above the spring to the position below the spring shown in Fig. 9.

The lever A and arm B cooperate with each other to aid in opening and closing the door. After the hook 8 on the arm B is interlocked with the lug 9, as shown in Fig. 8, the lever A is forced upwardly to impart the final impulse in closing the door. The lever is then interlocked with the lug 10, as shown by Figs. 1 and 9, and while the lever occupies this position the hook 8 cannot be removed from the lug 9. Therefore, the operation of latching the lever also latches the hook.

In opening the door, the lever A is moved downwardly, thereby moving the arm B and its hook 8 to the left from the position shown by Figures 1 and 8. The hook 8 is thus forced onto the flange 15 at the left side of Fig. 8, and a continued downward motion of the lever A will then impart the initial impulse in opening the door.

The seal holder D is supported by the hinge pin 25, and as previously indicated, the lower portion of this seal holder is latched in the path of the lever A (Fig. 9), so the hinged door which forms this seal holder must be opened before the lever can be released from the lug 10. When this hinged door, or seal holder, is moved to its extreme open position it may be held in a manner which I will now describe, to prevent swinging about the axis of the hinge and also to retain said door in a position near the side of the car where it is not likely to strike any object near the course of the car. To illustrate this feature I have shown a lug 55 (Figures 1, 3 and 5) at the bottom of the hinge member 26 on the door, and a recess 56 in the lower hinge member 27 adapted to receive said lug 55. When the door, or seal holder, D is moved to the open position shown by Fig. 5, the lug 55 enters the recess, said door being free to drop by gravity in a line parallel with the axis of the hinge, so as to locate the lug in the recess. The door D is thus latched in its open position, but it can be easily closed by lifting the door to withdraw the lug 55 from the recess 56, and then moving said door about the axis of its hinge.

Fig. 11 shows a portion 40 excided from the seal E, and this portion is permitted to drop from the bottom of the support in which the latching element 20 is mounted. Fig. 8 shows that the lugs 10 and 24 do not close the bottom of this support.

I claim:

1. In a latch provided with a seal, a latching member, a seal-rupturing member cooperating with the seal to retain said latching member in its latched position, both of said members being movable to unlatch said latching member, the seal being in the path of said rupturing member, and a seal holder whereby the seal is secured to prevent displacement thereof during the rupturing operation, said seal holder comprising a hinged closure whereby the seal is confined, and means for latching said closure in its open position.

2. In a latch provided with a seal, a support, a latching device movable in said support, a seal holder hinged to said support and having an opening to expose the seal, said seal holder having lugs on its inner face adapted to interlock with the seal and a spring to hold the upper portion of the seal, a seal-puncturing member pivoted to said latching device and having an upper edge adapted to enter the seal, said spring being in the path of said puncturing member to direct its upper edge into the seal, and said latching device being provided with a shearing edge adapted to cooperate with said upper edge in severing a portion of the seal.

3. A latch comprising a support provided with a vertical guide, a lever adapted to interlock with said support, a hook pivoted to said lever and also adapted to interlock with said support, a latching device slidable in said guide and having a latching member cooperating with said lever to latch both the lever and hook, a seal holder comprising a door hinged to said support and having an opening to expose the seal, said door having lugs on its inner face adapted to interlock with the seal and a spring to hold the upper portion of the seal, a seal-puncturing member pivoted to said slidable device and having an upper edge adapted to enter the seal, said spring being in the path of said puncturing member so as to direct said upper edge into the seal, said slidable device having a shearing edge adapted to cooperate with said upper edge in severing a portion of the seal, and said slidable device being provided with stops to limit the pivotal motion of said seal-puncturing member.

4. A latch comprising a support, a door-operating lever adapted to interlock with said support, an arm pivoted to said lever and also adapted to interlock with said support, a latching device movable in said support and having latching means to secure said arm and lever, and a seal holder hinged to said support and latched by said latching means, a portion of said seal holder being in the path of said lever to prevent release of the lever while the seal-holder is closed.

5. A latch comprising a support, a door-operating lever adapted to interlock with said support, an arm pivoted to said lever and also adapted to interlock with said support, a latching device movable in said support and having latching means to secure said arm and lever, a seal holder hinged to said support and latched by said latching means, a portion of said seal holder being in the path of said lever to prevent release of the lever while the seal-holder is closed, said seal holder being movable to an open position at one side of said support, and means to latch the seal holder in said open position.

6. In a device of the kind described, a latch provided with a seal, a latching element, a seal holder secured by said latching element, and an exciding member, adapted to cut out and remove a portion of the seal, cooperating with said seal to secure said latching element.

7. In a device of the kind described, a latch provided with a seal, a latching element, a seal holder secured by said latching element, an exciding member, adapted to cut out and remove a portion of the seal, connected to said latching element, and means for engaging said exciding member with the seal.

8. In a device of the kind described, a latch provided with a seal, a latching element, a seal holder secured by said latching element, an exciding member, adapted to cut out and remove a portion of the seal, cooperating with the seal to secure said latching element, and an abutment adapted to direct said exciding member into the seal.

9. In a device of the kind described, a latch provided with a seal, a latching element, a seal holder comprising a closure secured by said latching element, and an exciding member, adapted to cut out and remove a portion of the seal, connected to said latching element.

10. In a latch provided with a seal, a latching element, a separate operating member adapted to unlatch said latching element, and a seal exciding device driven by said operating member and adapted to cut out and remove a portion of the seal before the latching element is unlatched.

11. In a latch provided with a seal made of sheet material, a seal holder interlocked with said sheet material, a latching member, and a seal-mutilating device including an exciding member, adapted to cut out and remove a portion of said sheet material, cooperating with said sheet material to retain the latching member in its latched position, both of said members being movable independently of said seal holder to unlatch said latching member, and said sheet material being in the path of said exciding member.

12. In a latch provided with a seal, a latching element, and a seal-mutilating device cooperating with said seal to secure said latching element, said seal-mutilating device including a puncturing member adapted to be forced through the seal, and a severing member cooperating with said puncturing member to cut out and remove a portion of the seal.

13. In a latch provided with a seal, a latching element, and a seal-exciding device cooperating with said seal to secure said latching element, said seal exciding device including a puncturing member adapted to be forced through the seal, a severing member cooperating with said puncturing member to cut out and remove a portion of the seal, and a seal holder interlocked with the seal to prevent displacement of the same after it is excided.

14. In a latch provided with a seal, a latching element, and a seal-exciding device cooperating with said seal to secure said latching element, said seal-exciding device including a puncturing member adapted to be forced through the seal, a severing member cooperating with said puncturing member to cut out and remove a portion of the seal, and a seal holder interlocked with the seal to prevent displacement of the same while it is excided, said seal holder having a projection extending through the seal, and abutment shoulders engaged by the seal, said projection and said shoulders securing the seal during and after the excision.

15. In a latch provided with a seal, a latching member, a seal-exciding member, adapted to cut out and remove a portion of the seal, cooperating with the seal to retain said latching member in its latched position, both of said members being movable to unlatch said latching member, the seal being in the path of said exciding member, and a seal holder interlocked with the seal to prevent displacement of the seal during and after the exciding operation.

16. In a latch provided with a seal, a latching member, a seal-exciding member, adapted to make an excision in the seal, cooperating with the seal to retain said latching member in its latched position, both of said members being movable to unlatch said latching member, the seal being in the path of said exciding member, and a seal holder comprising a closure interlocked with the seal to confine the seal during and after the excision.

17. In a latch provided with a seal, a latching member, a seal-exciding member cooperating with the seal to retain said latching member in its latched position, both of said members being movable to unlatch said latching member, the seal being in the path of said exciding member, a seal holder comprising a hinged closure interlocked with the seal and secured by the latching element, and means for latching said closure in its open position.

18. In a latch provided with a seal, a latching member, a seal-exciding member cooperating with the seal to retain said latching member in its latched position, both of said members being movable to unlatch said latching member, the seal being in the path of said exciding member, a seal holder comprising a closure whereby the seal is confined, means on the closure securing the portion of the seal remaining after the excision, and an abutment on said closure adapted to direct said exciding member into the seal as the latching member is moved to its unlatched position.

19. In a device of the kind described, a latch provided with a seal having identifying indicia, a latching element, a rupturing member, adapted to rupture the seal, cooperating with the seal to secure said latching element, and a seal holder having two apertures associated with the seal, one aperture exposing said indicia, and the other aperture being in the path of said rupturing member.

20. In a latch provided with a seal, a latching element, and a seal-exciding member driven by said latching element and adapted to cut out and remove a portion of said seal, said portion of the seal being in the path of the exciding member and another portion of the seal being provided with indicia indentifying the seal.

In testimony that I claim the foregoing I hereunto affix my signature.

ERNEST A. CONAWAY.